United States Patent Office.

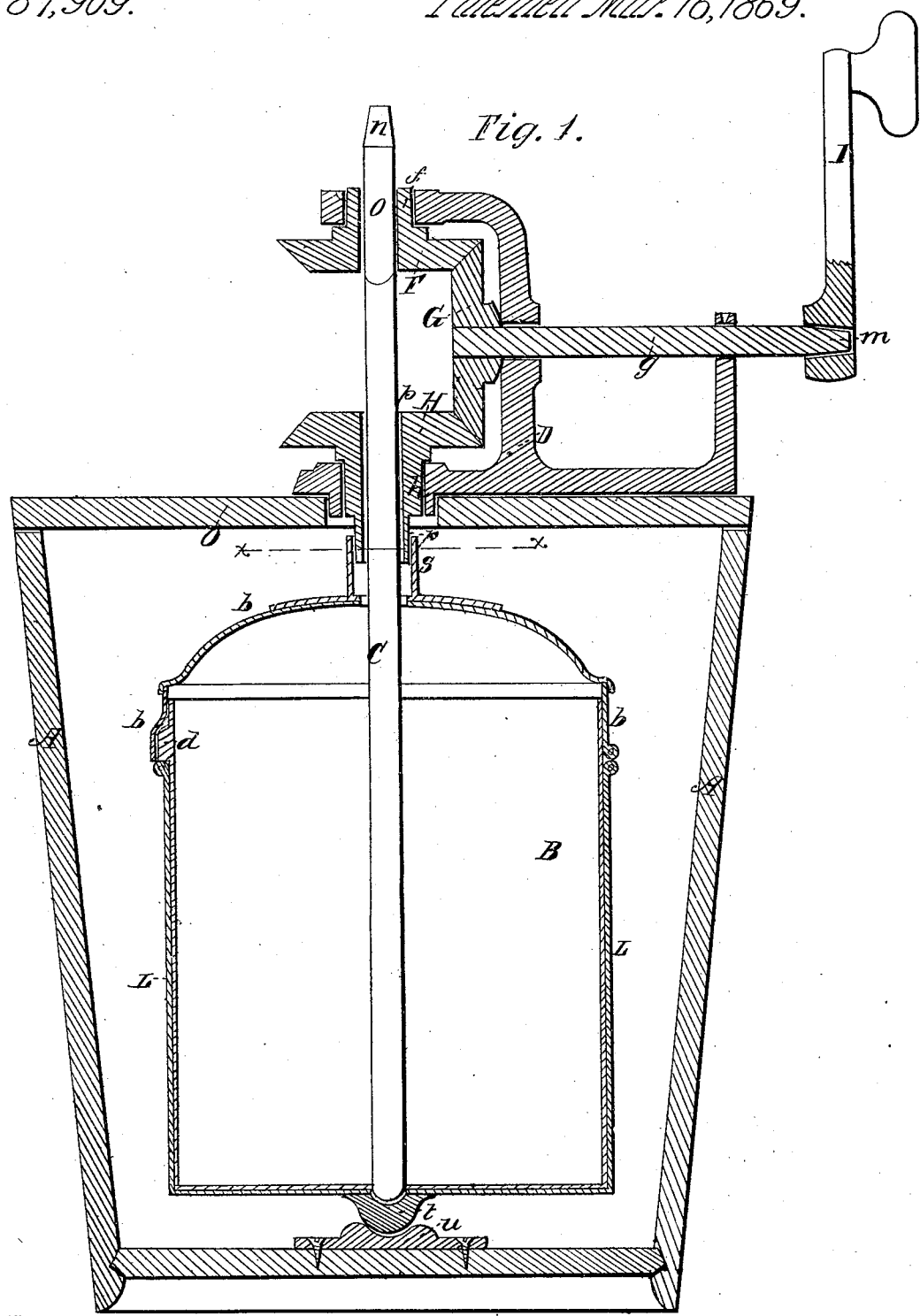

JOHN R. CHAMPLIN, OF LACONIA, NEW HAMPSHIRE.

Letters Patent No. 87,909, dated March 16, 1869.

IMPROVED ICE-CREAM FREEZER.

The Schedule referred to in these Letters Patent and making part of the same.

*To all whom it may concern:*

Be it known that I, JOHN R. CHAMPLIN, of Laconia, in the county of Belknap, and State of New Hampshire, have invented an Improved Ice-Cream Freezer; and I do hereby declare that the following is a full and exact description thereof, reference being had to the accompanying drawings, making part of this specification—

Figure 1 being a central vertical section of my improved ice-cream freezer.

Figure 2, a horizontal section in a plane indicated by the line x x, fig. 1.

Like letters designate corresponding parts in both figures.

Let A represent the ice-box of an ice-cream freezer;
B, the cream-cylinder; and
C, the beater-shaft.

My improvement consists in an improved driving-gear, for rotating the cream-cylinder B and beater-shaft C in opposite directions, so as not merely to be simple, strong, durable, and effectual in itself, but so as to be readily separated from the freezer, to get access thereto, and to be easily replaced, ready for operation.

The gear is mounted in a simple cast-iron frame, D, with base and uprights, and secured to a cross-bar, O, which rests in notches in the upper edge of the ice-box A, or is otherwise secured thereto, so as to be readily and conveniently removed therefrom, and replaced in position.

In this frame, three bevel-cog wheels, or pinions, F, G, and H, have their bearings; the two, F and H, having their axes in one vertical line, and the other, G, connecting them. The latter is preferably mounted on a horizontal shaft, g, for the purpose of receiving a crank, I, (a driving-pulley when it is to be driven by fixed power;) but this shaft is not absolutely necessary, as the crank or pulley may be applied to the upper projecting end of the beater-shaft C.

The ends m, of the shaft g and n of the beater-shaft C, may be square or angular, to fit the socket of the crank I, in order that the crank may be shifted from one to the other, at pleasure.

The journal f, of the pinion F, is enlarged, and the pinion has a square or angular socket, in which the square, or similar-formed shank, a, of the beater-shaft fits, so as to turn with the pinion, but to drop therefrom as the gear is raised from the freezer.

A still larger aperture, p, is formed in the centre of the pinion H, so that the beater-shaft will both turn freely, without contact, therein, and drop through it as the gear is raised, whereby the beater is left entirely free from the gear, ready to be taken from the cream-cylinder.

The journal h, of the pinion H, being enlarged sufficiently, turns in the bearing of the frame D, and is thence extended downward, and terminates in a square or angular coupling-projection, r, which fits a socket, s, attached to the cover b of the cream-cylinder, as seen in both figures.

The cover b fits freely over the top of the cream-cylinder, and has a notch, or cavity in one side, to fit over a boss, or projection, d, in the cylinder, to cause the same to turn with the cover. The cover, however, is readily taken from the cylinder.

Thus, with this construction, the driving-gear is easily and quickly placed upon the freezer, and coupled to the beater-shaft and cream-cylinder, and as readily detached therefrom when the freezing is completed.

The lower end of the beater-shaft turns freely in a hollow step, t, which projects down from the bottom of the cream-cylinder, and itself, in turn, forms a bearing for the cream-cylinder, turning in a step, u, of the ice-box.

The combined step and bearing t may be made of cast-iron.

I cover the cream-cylinder B with a "protector," L, being a plate of galvanized iron, copper, or other suitable metal, surrounding the cylinder, to stiffen and give strength to the same, and take the wear of the ice thereon. With this protector the cylinder may be made of tin-plate, free from any deleterious effect on the cream, and still, sufficient strength and durability be given thereto:

What I claim as my invention, and desire to secure by Letters Patent, is—

The combination and arrangement of the freely-fitting beater-shaft C, projecting up through its pinion F, to receive the driving-crank, the gear-frame D, freely removable with the cross-bar to which it is attached, and the pinion H, with its coupling-projection r, fitting the socket s of the cream-cylinder, so as to readily lift therefrom with the gear-frame, all substantially as herein specified, the whole constituting a driving-apparatus for the freezer, of great convenience in applying to and detaching from the freezing-cylinder, as herein specified.

The above specification of my improved ice-cream freezer signed by me, this 27th day of April, 1868.

JOHN R. CHAMPLIN.

Witnesses:
J. L. P. WHIPPLE,
JAMES M. DAVIS.